March 2, 1943.　　　　O. C. KOCH　　　　2,312,650
RADIO CONTROL ASSEMBLY
Filed Aug. 18, 1941　　　3 Sheets-Sheet 1
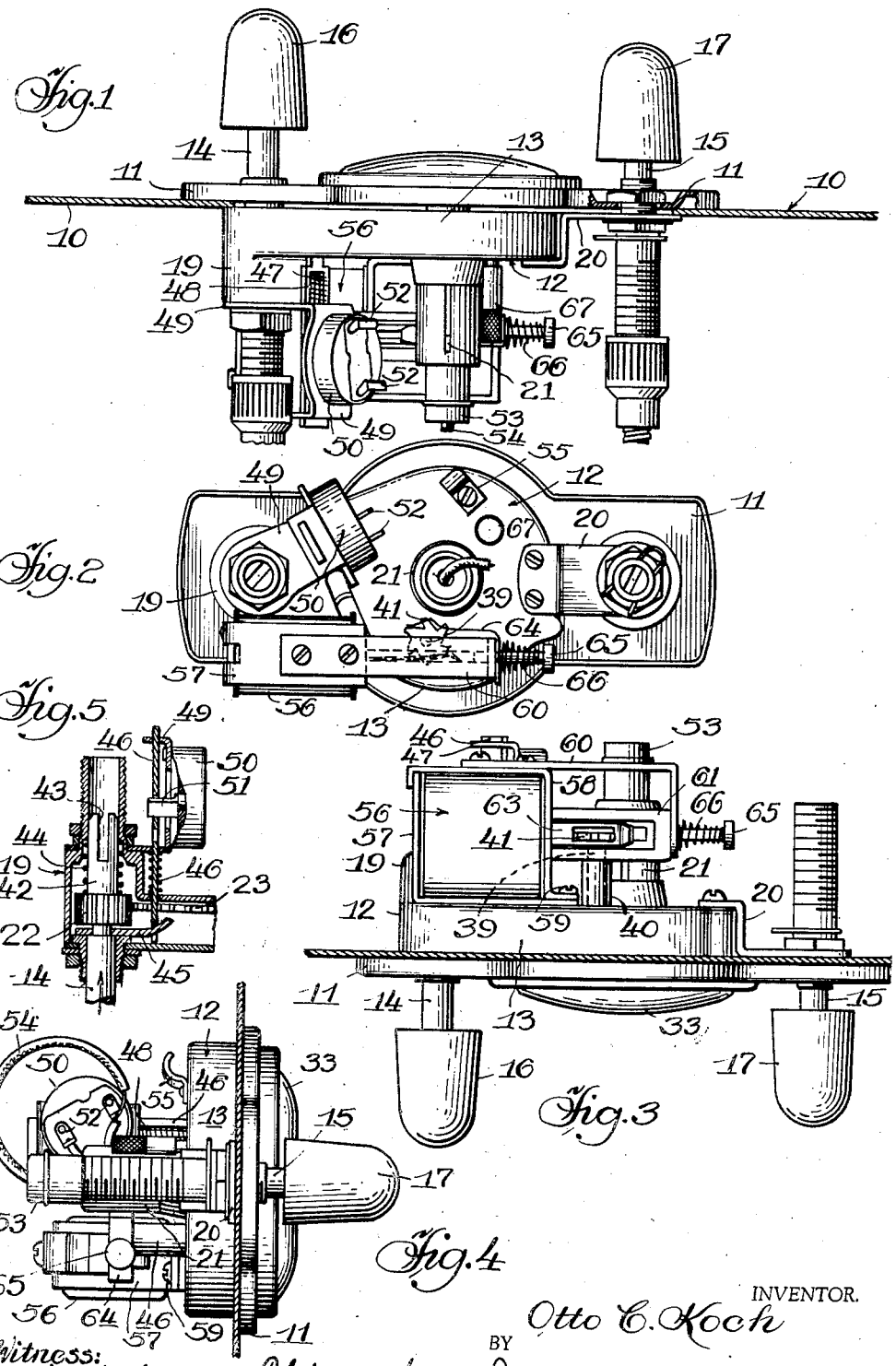
INVENTOR.
Otto C. Koch March 2, 1943.  O. C. KOCH  2,312,650
RADIO CONTROL ASSEMBLY
Filed Aug. 18, 1941   3 Sheets-Sheet 2
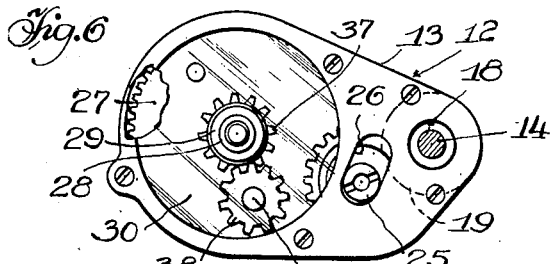
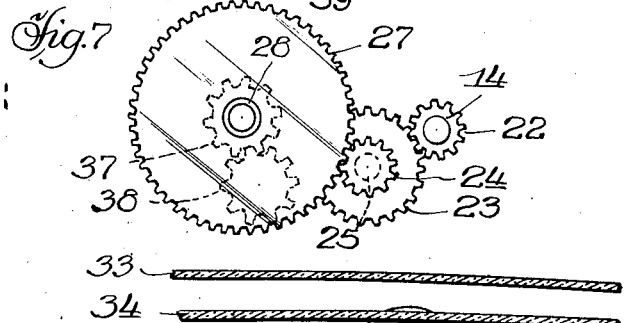
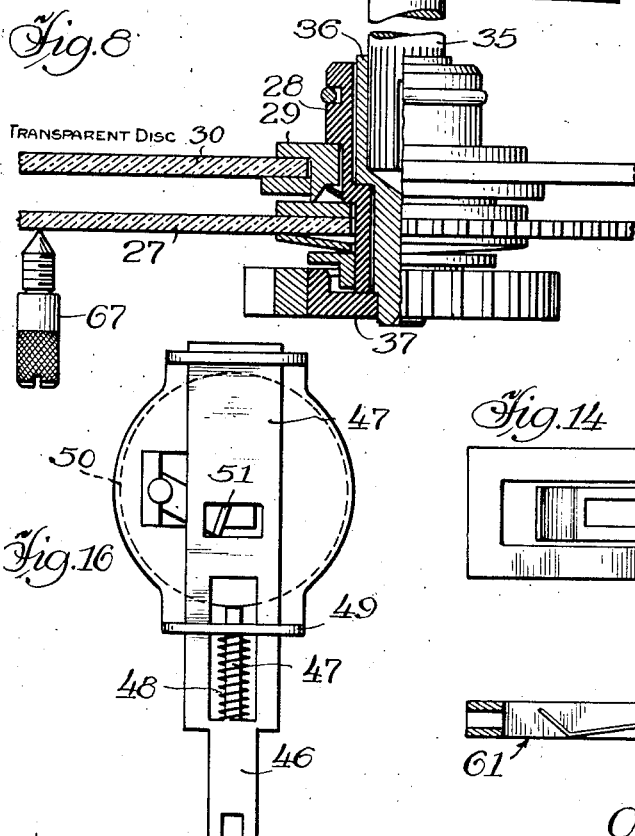
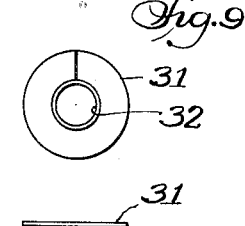
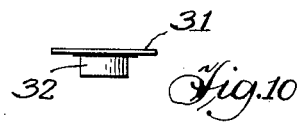
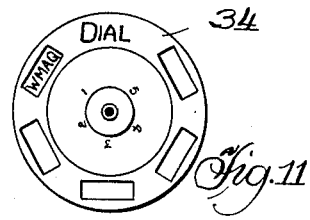
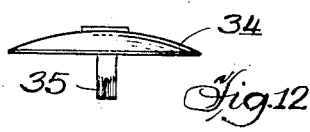
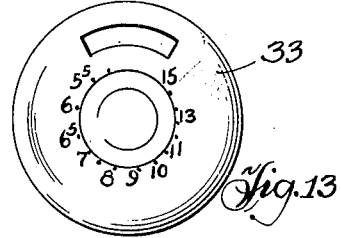
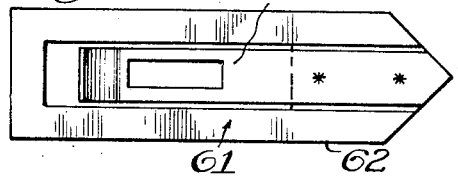
INVENTOR.
Otto C. Koch
BY Chritton, Wiles, Davies & Hirschl
Attys.

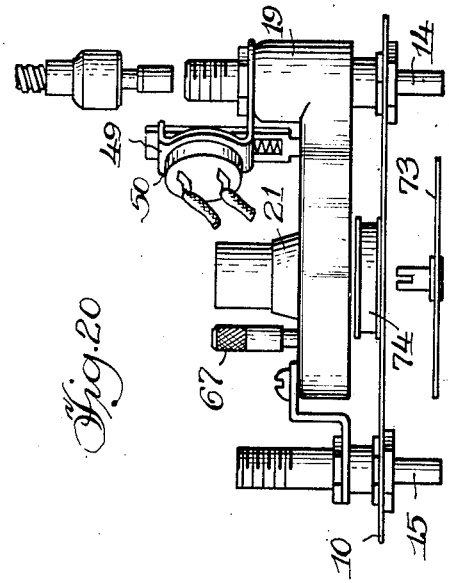
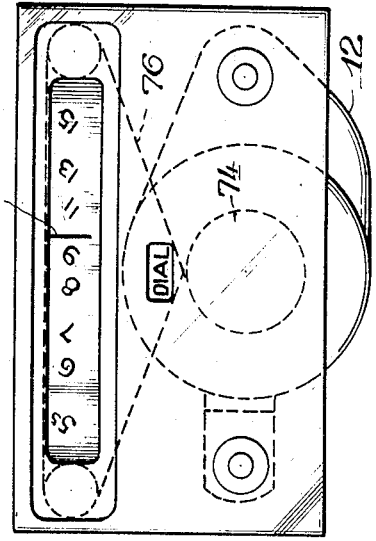
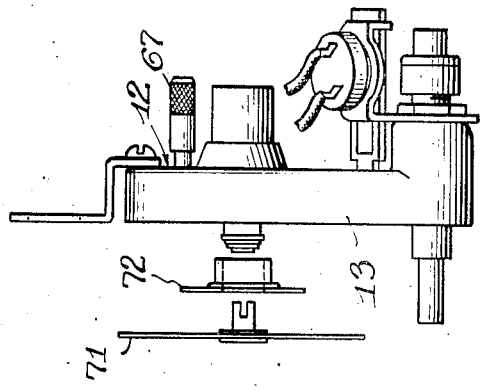
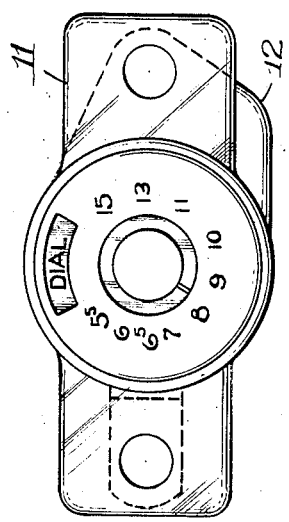
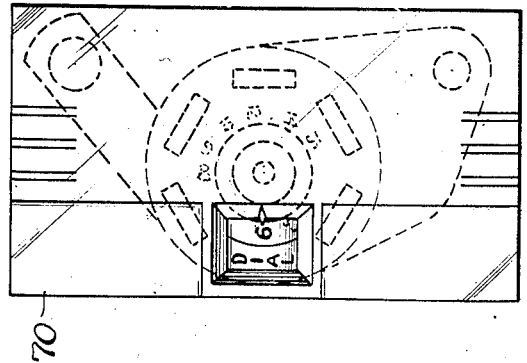

Patented Mar. 2, 1943

2,312,650

UNITED STATES PATENT OFFICE 2,312,650

RADIO CONTROL ASSEMBLY

Otto C. Koch, Chicago, Ill., assignor to F. W. Stewart Manufacturing Corporation, Chicago, Ill., a corporation of Illinois Application August 18, 1941, Serial No. 407,378

9 Claims. (Cl. 250—40)

My invention relates to improvements in radio control assemblies such as may be mounted on the instrument panels of automobiles, on the steering wheels, or elsewhere.

One object of the invention is to provide a complete control assembly including a tuning shaft and a volume control shaft, by means of which a number of selected stations may be tuned in by reciprocating the tuning shaft and the remaining stations, within the capacity of the instrument, may be tuned in by rotating said shaft.

Another object is to provide equipment of this character which includes a switch and an electrically controlled pawl and ratchet mechanism mounted directly on the tuning unit, whereby a unitary structure is provided which may be conveniently mounted in or behind an existing opening in the instrument panel of almost any car.

A further object is to provide an improved and simplified pawl and ratchet mounted on an extension of the frame of the actuating solenoid.

An additional object is to provide an improved and compact station indicator comprising a plurality of relatively rotatable parts, concentrically mounted, and a single operating shaft having both mechanical and electrical connections with said parts, to actuate them independently.

A commercial embodiment of the invention is shown in the drawings.

Fig. 1 is a plan view of the tuning unit assembly;

Fig. 2 is a rear view thereof;

Fig. 3 is a bottom view of the Fig. 2 structure;

Fig. 4 is an end view;

Fig. 5 is a section, partly in elevation, on the line 5—5 of Fig. 2;

Fig. 6 is a front view of the tuning unit;

Fig. 7 is a diagram of the gear train;

Fig. 8 is an enlarged central, sectional elevation of certain details;

Fig. 9 is a front view of the rotatable pointer disc;

Fig. 10 is a bottom view thereof;

Fig. 11 is a front view of the rotatable station indicator disc;

Fig. 12 is a bottom view thereof;

Fig. 13 is a front view of the fixed dial;

Fig. 14 is a plan view of a ratchet bar;

Fig. 15 is a central section thereof;

Fig. 16 is an elevation of a switch bar and associated parts;

Fig. 17 is a front view of an escutcheon plate and dial assembly;

Fig. 18 is a similar elevation of a modified escutcheon plate and dial assembly;

Fig. 19 is a side elevation thereof only partially assembled;

Fig. 20 is a top view of another modification, incompletely assembled; and

Fig. 21 is an elevation thereof behind an apertured cover plate.

In the drawings the usual instrument board of the automobile is shown at 10. When the parts are assembled, a cover plate or escutcheon 11 is on the side of the panel facing the driver, whereas the casing 12 or housing for the gear train is on the opposite side of said panel, concealed from view. This housing, which is shown in Fig. 6, is of irregular shape and is of hollow construction, having a flange 13 around its periphery. It is referred to hereinafter as the tuning unit. The general form of this unit and of the cover plates, with any one of a number of which it may be assembled, and the manner of mounting the same on the instrument panels of different cars are substantially the same as what is shown in Hirt Patent 2,208,512 of July 16, 1940. In the radio control assembly shown in said patent, both the tuning shaft and the volume control shaft are mounted for rotation only.

In the construction shown herein the tuning shaft 14 is mounted not only for rotation but for reciprocation. The volume control shaft 15 is rotatable, in the usual way. The tuning shaft is provided with a tuning knob 16 and the volume control shaft is provided with a similar knob 17, as shown in Figs. 1 and 3. In order to properly position the tuning unit 12, it is provided near one end with an opening 18, as shown in Fig. 6, to receive the tuning shaft 14. This end of the unit is also provided with an extension or boss 19 within which said shaft is housed. The other end of the unit is held in place by a bracket 20 secured thereto and having an aperture which receives the volume control shaft 15. Thus the unit is held in place behind the instrument panel in proper registration with an opening in said panel so that the relatively movable parts of the dial or station indicator may be read from the front and so that the escutcheon plate may properly cover the opening in the instrument panel. In addition to the boss 19, the unit is provided with a cylindrical extension 21 at the rear, concentric with the axis of rotation of the pointer shaft. This extension receives the fitting which contains the lamp socket and the small lamp by means of which the dial is illuminated from the rear much in the same manner as in the Hirt assembly referred to.

Rotation of the tuning shaft 14 drives a train of gears, shown somewhat diagrammatically in Fig. 7, i. e. the pinion 22 is mounted on said shaft and engages a gear 23 which rotates with another pinion 24, mounted on the same stub shaft 25 as is said gear. Said shaft has a certain limited adjustment in the slot 26, shown in Fig. 6. The pinion 24 engages the teeth of a transparent gear 27 which is mounted to turn with a sleeve 28 mounted in a bushing 29 supported in an opening in a transparent supporting disc 30, which is mounted in the left hand end of the unit as viewed from the front in Fig. 6. A small disc 31 (Figs. 9 and 10) is mounted on the sleeve 28 and hence rotates with said transparent gear. It constitutes a pointer disc 31, having a radial line or some other designation thereon to indicate its angular position when rotated. It is provided with a flange 32 which fits over the sleeve 28 and turns with it. When the operator rotates the knob 16 and thus drives the train of gears shown in Fig. 7, the pointer disc 31 turns, to indicate any desired station, as usual. Said dial disc is mounted behind a stationary cover plate or dial 33, of any suitable form, having a transparent circular zone through which the numbers 1, 2, 3, 4, 5 on disc 34 (Fig. 11) are visible. In Fig. 13 the usual station indicating numbers are arranged in a circular path. Said cover plate may be opaque, except for a transparent circle through which the pointer disc is visible and except for a window at the top or bottom, or at the sides, through which letters are visible, indicating any one of a number of stations to be tuned in by reciprocation of the tuning knob 16, as hereinafter explained.

When said knob 16 is turned in the usual way, the outer sleeve 28 rotates with the transparent gear and the pointer disc also rotates to indicate any of the stations within the capacity of the instrument, in a manner which is well understood.

The stations to be selected by the reciprocations referred to are shown on a rotatable and partially transparent station indicator disc 34, shown in Fig. 11. This disc has a central stem 35 having a firm frictional fit within the sleeve 36 which turns within the larger sleeve 28. Said sleeve has a gear 37 mounted at the inner end thereof which meshes with another gear 38, shown in Figs. 6 and 7. This gear is on a shaft 39 (see Figs. 2 and 3) which turns in a ratchet shaft bushing 40 and has a ratchet wheel 41 mounted thereon. Said ratchet wheel is given a step by step movement by an electrically actuated pawl mechanism which will now be described.

Referring again to the tuning knob 16, which may be reciprocated as well as rotated, said knob is mounted on the shaft 14, which, as more clearly shown in Fig. 5 has the pinion 22 mounted thereon which drives the train of gears shown in Fig. 7. The pinion 22 is thick enough to permit it to slide back and forth a substantial distance while retaining its contact with the gear 23. Said shaft 14 has a two-part construction, the inner part 42 (which appears as the upper part in Fig. 5) supports said pinion 22 which is pressed onto it and it has the usual bifurcated end 43. A helical spring 44 is compressed between said pinion and an inner wall in the boss 19 of the housing. An actuating arm 45 is held in place rotatably between said pinion and the end of the shaft 14, and it is engaged by the bifurcated end of a switch bar 46 which has a struck-out tongue 47, shown in Fig. 16. A smaller helical spring 48 surrounds said tongue (see Fig. 1) and is compressed when the knob 16 is pushed inwardly. Thus it tends to restore said switch bar to initial position without binding.

The switch bar 46 is guided in openings in a switch bracket 49 which supports a small snap switch 50 of conventional form. The end of the switch arm 51 is bent outwardly and received in a small opening in said switch bar 46, as shown in Fig. 5. The switch terminals 52 are shown at the rear of the switch as shown in Figs. 2 and 4. One of them is connected to the lamp socket housing 53 by a conductor 54 and the other to the solenoid hereinafter described. In addition, both of said terminals have connected thereto the ends of the main pair of conductors which lead to a battery. Said conductors, which are not shown, may be conveniently held to the unit by a bracket 55, shown also in Figs. 2 and 4.

The solenoid 56, which is energized intermittently when the switch is actuated, is supported in a frame formed preferably from two brackets 57, 58, shown in Fig. 3 and detachably secured to the gear housing 12 by suitable screws 59. In this manner a compact assembly is provided with the solenoid and the switch mounted directly on the rear of said housing or unit, providing a unitary structure.

The bracket 58 has a ratchet bar support 60 secured thereto which supports the ratchet bar 61 shown more in detail in Figs. 14 and 15. One end 62 constitutes the core of the solenoid and has a flat spring 63 secured thereto, preferably by spot welding and consisting of a strip of bronze. The bent end of said spring is received within the longitudinal opening in said ratchet bar and is positioned to engage the teeth of the ratchet wheel 41 as it reciprocates. A ratchet stop spring 64 is also provided, as shown in Fig 2. It will be evident that when the switch is connected to a suitable battery, and the knob 16 is pushed inwardly, the solenoid will be energized and draw in its core and on repeated operations the operator may rack the ratchet wheel around one tooth at a time. In this way the gears 38, 37, are given a step by step movement which is imparted to the disc 34 (see Figs. 11 and 12). Thus said disc is rotated to any one of six positions, including five designated stations, for example the ones used most frequently. The sixth position of said disc 34 shows the word "Dial" at the top. It is necessary to leave the indicating parts in this position when rotating the knob 16 to tune in any desired remaining station other than the five most frequently used, for the reason that said selective switch maintains the proper circuit connections for that purpose. It will also be understood that reciprocation of the tuning knob will operate any conventional step-by-step tuning system.

As shown in Figs. 1, 2 and 3, said disc may also be racked around by hand in making the initial adjustment of the station numbers so that they will be properly synchronized with the radio receiver set. This is done by pressing the stem 65 which is secured to the end of the ratchet bar 61 which is normally held in outermost position by a helical spring 66. It is necessary to reach in behind the instrument board in order to effect this manual operation, as the stem 65 is normally concealed behind the unit.

When the instrument is first installed, it is necessary to complete all connections between the controls and the radio receiver set mounted elsewhere in the automobile and calibrate said instrument to insure that the dial readings correspond to the stations selected, when the tuning knob is rotated. Calibration can be accomplished by either of the following methods:

Rotate the tuning knob 16, thereby rotating pointer disc 31 by means of the gear train previously described. Rotation may be in either clockwise or counter-clockwise direction depending on which end of the dial scale 33 the pointer disc 31 will reach. With the pointer disc at one end of the dial scale, it is necessary to hold the pointer disc in a fixed position. This can be accomplished by the binding screw 67 shown in Figs. 1, 2 and 8. It is mounted in a screw threaded opening in the housing of the unit 12 with the exposed end knurled to enable it to be turned readily and the inner end is cone shaped and presses against transparent gear 27 preventing rotation when screwed in far enough. With the pointer disc thus held stationary, the operator rotates the tuning knob 16. Any suitable friction device may be used between gears 23 and 24 which will permit the temporary relative rotation, allowing the radio receiver set to be brought to the proper rotative position to correspond with the setting of the pointer disc.

The alternate method is to rotate the pointer disc 31 to a frequency number on the fixed dial 33, the number selected being the known frequency of a broadcasting station. The pointer disc is held stationary in the same manner as described above while the radio receiving set is tuned to the selected frequency by means of tuning knob 16.

After calibrating by either of the above methods, the binding screw 67 is backed off to permit rotation of the pointer disc. A front view of the instrument is shown in Fig. 17 in which the escutcheon plate 11 is assembled with a dial known as the full vision or airplane type.

In Fig. 18 a peep hole type of dial is shown in which an escutcheon plate 70 is arranged preferably vertically and is provided with an opening through which the call letters on the disc 71 and 72 are visible. The pointer disc assembly 72 is pressed over the adjacent sleeve or center shaft and the disc 71 is pressed lightly into place concentrically with the dial assembly.

In Fig. 20 the call letter disc assembly 73 is pressed lightly into position, as before, concentrically with the shaft on which the pulley 74 is mounted. The letters on said disc are visible through the smaller of the two openings in the escutcheon plate. A cord or string 76 is moved one way or the other by said pulley to move the pointer 77 back and forth over the figures on the dial 78. This type of dial is known as the slide rule type.

These three different forms just described illustrate the wide range of adaptibility of the unit to different types of escutcheon plates and dials.

The foregoing equipment permits a complete installation to be readily made on the instrument board of almost any automobile and it presents a balanced, pleasing appearance without cutting additional holes in the instrument panel or otherwise mutilating the same. With the available parts the installation is very flexible in the sense that any one of a large number of combinations may be worked out without carrying an unduly large number of different parts in stock.

Although several specific embodiments of the invention have been illustrated and described, the same are to be considered in an illustrative and not in a limiting sense, as various other modifications may be made in the form and arrangement of the parts and certain features may be used without others, all without departing from the spirit and scope of the invention.

I claim:

1. A tuning unit assembly comprising a gear housing having a dial shaft with relatively movable station indicating parts controlled thereby, a tuning shaft rotatably and slidably mounted in said housing, an electric switch supported by said housing, an actuating member associated with said switch and with said shaft to operate said switch to close a circuit when said shaft is reciprocated, a solenoid also mounted on said housing and energized when said circuit is closed, mechanism actuated by said solenoid for moving one of said station indicating parts, and mechanical connections between said dial shaft and said tuning shaft whereby relative movement of said station indicating parts may be caused by rotation of said tuning shaft independently of the sliding movement thereof.

2. A tuning assembly for mounting on the instrument panel of an automobile, comprising a gear casing mounted behind said panel and having concentric rotatable sleeves in registration with an opening in said panel, a tuning shaft mounted in said gear casing to rotate and to have a limited in and out longitudinal movement, indicator parts each connected to one of said sleeves, a train of gears from said shaft to one of said sleeves, a pawl and ratchet connected to the other of said sleeves and means actuated by the in and out movement of said shaft to operate said pawl and ratchet.

3. A tuning assembly as in the preceding claim with the addition of an escutcheon plate to cover said opening and a fixed dial plate mounted in said escutcheon plate.

4. A tuning unit assembly comprising a gear housing having a dial shaft with relatively movable station indicating parts controlled thereby, a tuning shaft rotatably and slidably mounted in said housing, an electric switch supported by said housing and having an arm, an actuating member mounted on said shaft to reciprocate therewith and engaging said switch arm, means controlled by said switch to actuate one of said station indicating parts and a train of gears between said shaft and another of said station indicating parts to rotate the latter when said shaft is rotated.

5. A tuning unit assembly comprising a gear housing having a dial shaft with relatively movable station indicating parts controlled thereby, a tuning shaft rotatably and slidably mounted in said housing, mechanical connections from said shaft to one of said indicating parts to position the same by rotating said shaft, an electric switch supported by said housing and having an arm, an actuating member mounted on said shaft to reciprocate therewith and engaging said switch arm, a solenoid supported by said gear housing and having electrical connections to said switch and to a battery, a pawl and ratchet mechanism actuated by said solenoid, and a gear train from said ratchet member to one of said station indicating parts.

6. A radio tuning device for mounting on instrument panels comprising a casing having a boss on the rear side thereof, a tuning shaft mounted to reciprocate and to rotate in said boss and having a pinion fixed thereto, a train of gears from said pinion to a movable indicator member, a helical spring surrounding said shaft within said boss between a wall thereof and said pinion, an actuating arm having an opening in which said shaft may turn but held against longitudinal movement thereon, a switch bar reciprocated by the longitudinal movement of said shaft and said actuating arm, a switch on said casing actuated to on and off position by said switch bar, a second movable indicator member in axial alignment with said first mentioned member, and electrical means controlled by said switch for advancing said second indicator member with a step by step movement.

7. A tuning unit casing having two concentric members each arranged to move an indicating part, a gear on each of said members, a second gear meshing with each of said first mentioned gears, an electrically actuated pawl and ratchet for rotating one of said second gears, a rotatable tuning shaft for rotating the other of said second gears, said shaft having also a reciprocating movement, and means operated during said movement to control the electrical actuation of said pawl and ratchet.

8. In a tuning unit, a housing, a transparent supporting panel therein, a bushing in an opening in said panel, concentric rotatable sleeves supported in said bushing, a gear on one of said sleeves, a second gear meshing therewith, a shaft mounted in said housing to which said second gear is secured, a gear on the other of said concentric sleeves, one of said gears being transparent, a source of light behind said panel, indicating parts in front of said panel, and electromagnetic means for actuating all of said gears and said indicator parts.

9. A tuning unit as in claim 8 with the addition of a friction member movably mounted in said housing and manually operated to press against said transparent gear to prevent rotation thereof.

OTTO C. KOCH.